(12) United States Patent
Long

(10) Patent No.: US 12,172,567 B1
(45) Date of Patent: Dec. 24, 2024

(54) CAMPING TRAILER

(71) Applicant: Jeffrey Alan Long, Tullahoma, TN (US)

(72) Inventor: Jeffrey Alan Long, Tullahoma, TN (US)

( * ) Notice: Subject to any disclaimer, the term of this patent is extended or adjusted under 35 U.S.C. 154(b) by 0 days.

(21) Appl. No.: 18/635,255

(22) Filed: Apr. 15, 2024

Related U.S. Application Data

(60) Provisional application No. 63/458,977, filed on Apr. 13, 2023, provisional application No. 63/459,241, filed on Apr. 13, 2023.

(51) Int. Cl.
*B60P 3/34* (2006.01)
*B62D 63/08* (2006.01)

(52) U.S. Cl.
CPC .............. *B60P 3/341* (2013.01); *B62D 63/08* (2013.01)

(58) Field of Classification Search
CPC .. B60P 3/341; B60P 3/34; B62D 63/08; B23P 2700/14; B23P 2700/50
USPC ................................. 296/159, 165, 169, 173
See application file for complete search history.

(56) References Cited

U.S. PATENT DOCUMENTS

| | | | | |
|---|---|---|---|---|
| 1,216,986 A * | 2/1917 | Habig | ...................... | B60P 3/341 5/119 |
| 1,241,342 A * | 9/1917 | Chapman | ................ | B60P 3/341 135/88.13 |
| 1,461,574 A * | 7/1923 | Caplan | ..................... | B60P 3/341 296/169 |
| 1,564,257 A * | 12/1925 | Lippman | ................. | B60P 3/341 296/169 |
| 3,062,579 A * | 11/1962 | Smith | ...................... | B60P 3/341 108/14 |
| 3,149,876 A * | 9/1964 | Melbye | .................... | B60P 3/341 135/904 |
| 3,170,724 A * | 2/1965 | Heil | ......................... | B60P 3/341 135/153 |
| 3,464,735 A * | 9/1969 | Smith | ..................... | B60P 3/341 135/117 |
| 3,488,084 A * | 1/1970 | Ekstrom | ................. | B60P 3/341 135/904 |
| 3,715,141 A * | 2/1973 | Cary | ....................... | B60P 3/341 296/173 |
| 3,917,337 A * | 11/1975 | Couix | ..................... | B60P 3/341 135/904 |
| 4,250,906 A * | 2/1981 | Rivier | ..................... | B60P 3/341 296/168 |
| 5,544,671 A * | 8/1996 | Phillips | .................. | B60P 3/341 135/88.14 |
| 6,102,468 A * | 8/2000 | Lowrey | ................... | B60P 3/341 296/173 |
| 6,179,368 B1* | 1/2001 | Karlsson | ................. | E04H 15/06 135/88.13 |
| 10,596,951 B1* | 3/2020 | Williams | ................ | B60P 3/343 |

(Continued)

*Primary Examiner* — Sarang Afzali
*Assistant Examiner* — Darrell C Ford
(74) *Attorney, Agent, or Firm* — Shane Cortesi

(57) ABSTRACT

The present disclosure provides camping trailers. In some embodiments, the camping trailer may include a left panel and right panel that fold outward along hinges and support corner braces that are attached to main interior poles. The main interior poles may be located interior to and directly below a tent and may support a tent. A pole clip may be directly below and support a center of the tent and the pole clip may include receptacles for receiving the main interior poles and a telescoping pole.

14 Claims, 16 Drawing Sheets

(56) References Cited

U.S. PATENT DOCUMENTS

| | | | |
|---|---|---|---|
| 11,247,601 B1* | 2/2022 | Metz | B60P 3/34 |
| D954,603 S | 6/2022 | Long | |
| D954,604 S | 6/2022 | Long | |
| 2003/0173758 A1* | 9/2003 | Badger | E04H 15/48 |
| | | | 280/656 |
| 2009/0001756 A1* | 1/2009 | Dempsey | B60P 3/42 |
| | | | 280/415.1 |
| 2009/0007948 A1* | 1/2009 | Dempsey | B60P 3/34 |
| | | | 135/96 |
| 2019/0292806 A1* | 9/2019 | Attema | E04H 15/48 |
| 2019/0375474 A1* | 12/2019 | Duthie | B62D 63/08 |

\* cited by examiner

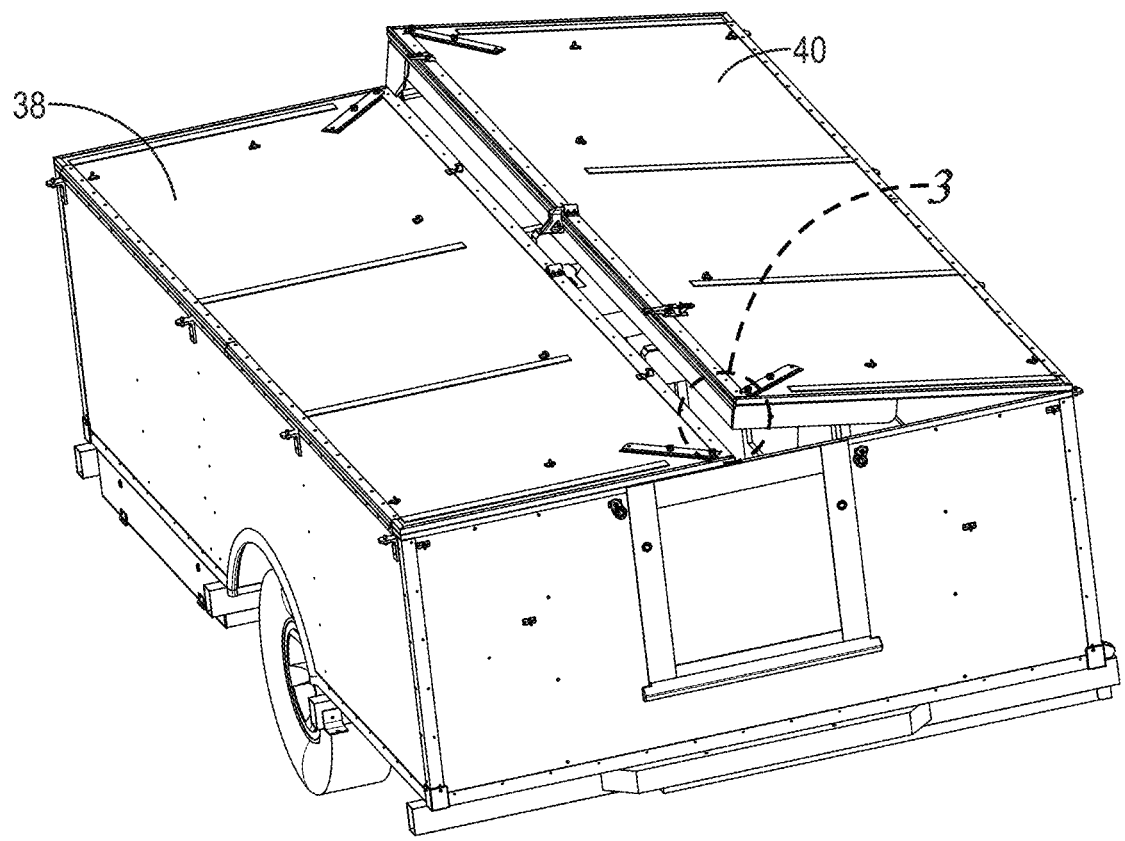
FIG. 2
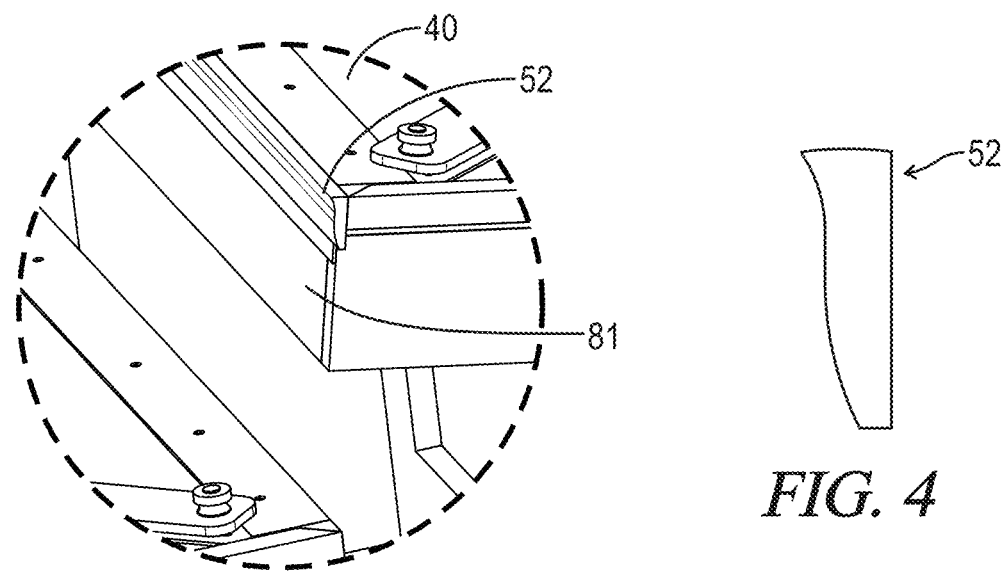
FIG. 3
FIG. 4

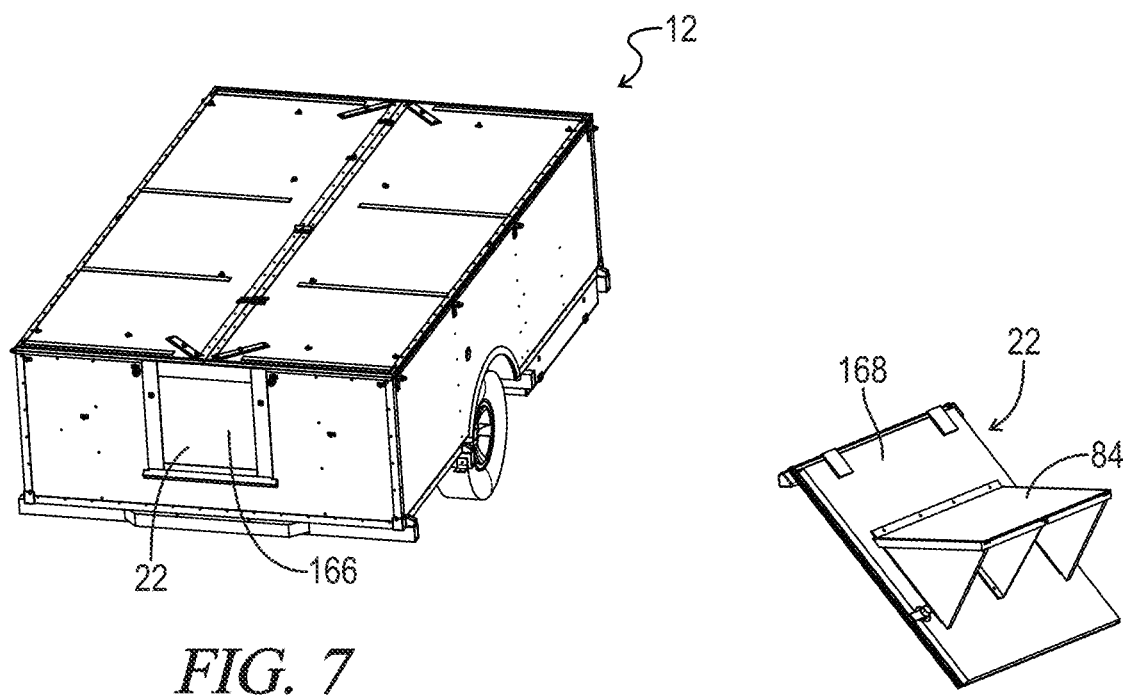
FIG. 7
FIG. 8
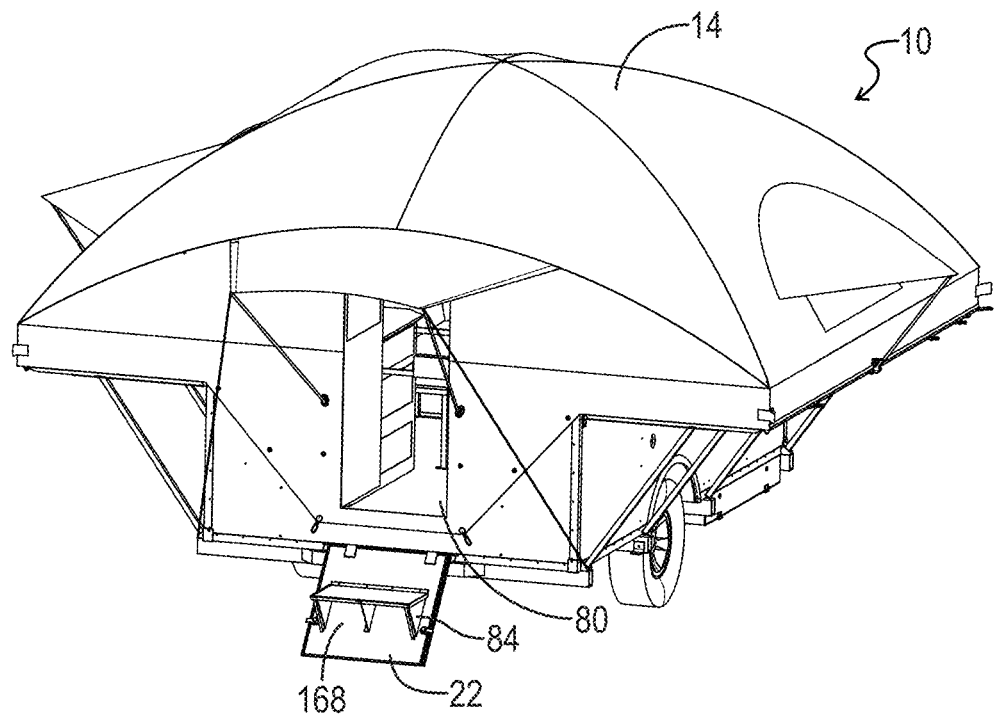
FIG. 9

CAMPING TRAILER

BACKGROUND

Technical Field

The present invention relates to camping trailers.

Background of the Invention

Camping trailers are known in the art but are typically bulky. Camping trailers typically have a collapsed/towing configuration in which the camping trailer is in a collapsed state so that it may travel to the campsite and an expanded configuration in which the camping trailer is expanded so that the camping trailer may be used as a source of shelter at the campsite. Camping trailers come in a variety of different designs.

However, there is a continuing need for inexpensive camping trailers that are easily towed by both full size and midsize vehicles, expand to a large volume, can be easily manufactured and can be easily and quickly assembled.

SUMMARY OF THE INVENTION

The present disclosure provides camping trailers as described herein.

BRIEF DESCRIPTION OF THE DRAWINGS

FIG. 2 illustrates a rear perspective view of the trailer box of FIG. 1, with the trailer box in the partially collapsed/towing configuration.

FIG. 3 illustrates a closeup view of the circled area labelled 3 in FIG. 2.

FIG. 4 illustrates the side/profile view of the lid seal of the trailer box of FIG. 2.

FIG. 7 illustrates a rear perspective view of a trailer box of one embodiment of the present invention, with the trailer box in the fully collapsed/towing configuration.

FIG. 8 illustrates a perspective view of a stair panel in accordance with one embodiment of the present invention.

FIGS. 9-10 illustrates a rear perspective view of the trailer box of FIG. 7 in the expanded configuration attached to a tent of one embodiment of the present invention.

DETAILED DESCRIPTION

Figure 1:
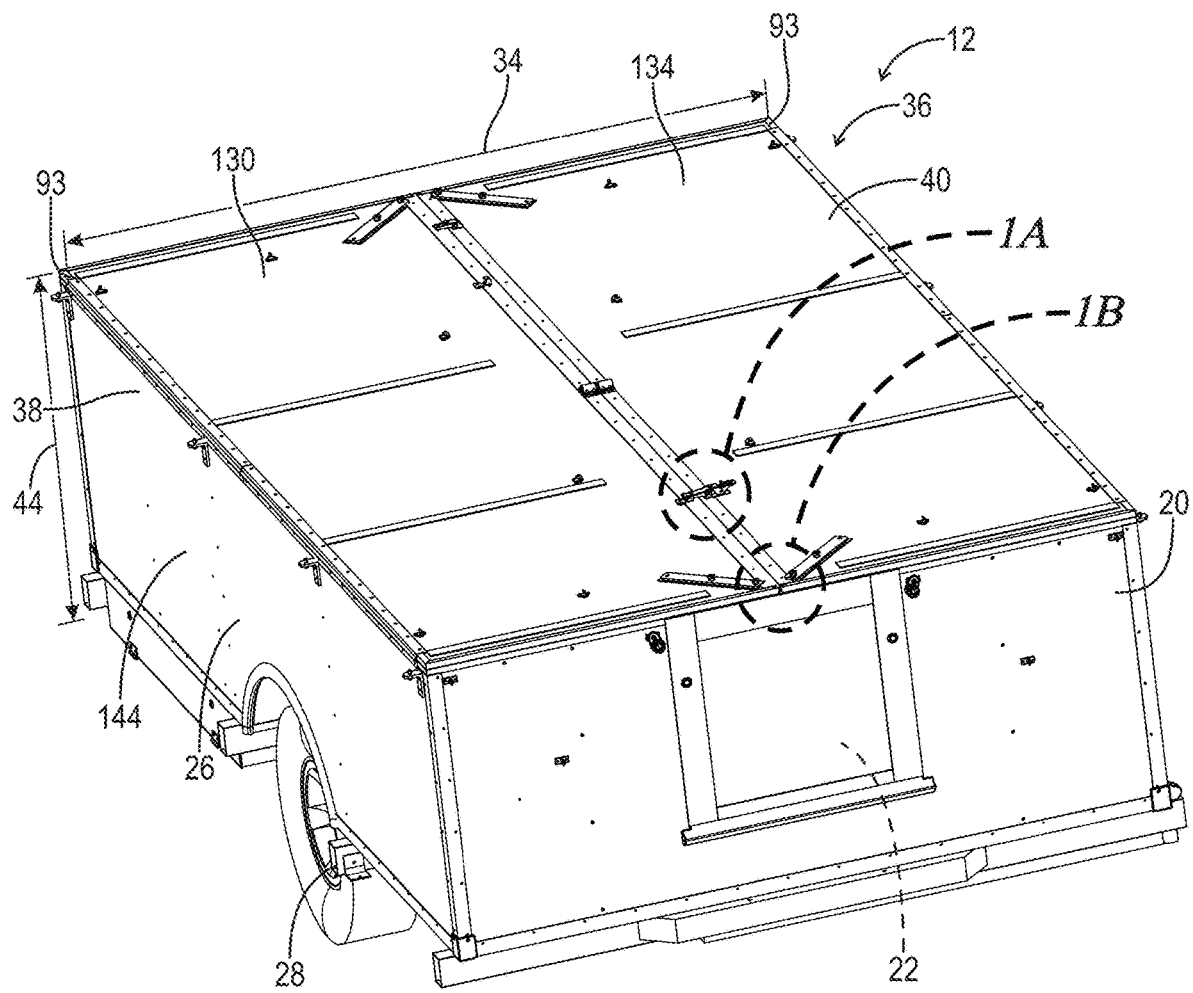
FIG. 1 illustrates a rear perspective view of a trailer box of a camping trailer of one embodiment of the present invention, with the trailer box in the fully collapsed/towing configuration.

With reference to FIGS. 1-15 the present disclosure provides a camping trailer generally designated by the numeral 10. In the drawings, not all reference numbers are included in each of the drawings for the sake of clarity. FIGS. 1-15 are drawn generally to scale, however, it will be appreciated that other dimensions are possible. The camping trailer 10 may include any of the features described below, alone or in any desired combination.

The Trailer Box

Generally speaking, the camping trailers 10 may include a trailer box 12 (or base) that unfolds and supports a tent 14 that is attached to, and extends above, the trailer box 12.

Referring to FIGS. 1-15, the trailer box 12 may have an interior 138, a front wall 16, a rear wall 20 that may include a door 22, a length 24 extending from the front wall 16 to the rear wall 20, a left sidewall 26, at least one left wheel 28 located adjacent to the left sidewall 26, a right sidewall 30, at least one right wheel 32 adjacent to the right sidewall 30, a width 34 extending from the left sidewall 26 to the right sidewall 30 and generally perpendicular to the length 24, a top/lid 36 that may be comprised of a left panel 38 and a right panel 40, a bottom 42, and a height 44 extending from the top/lid 36 to the bottom/chassis 42. The left and right panels 38 and 40 may also include exterior surfaces 130 and 134 and interior surfaces 132 and 136. The trailer box 12 may include a collapsed/towing configuration (shown in FIGS. 1 and 7) in which the left and right panels 38 and 40 are closed, the interior surfaces 132 and 136 of the panels 38 and 40 face the interior 138 (and downwardly) and are below the exterior surfaces 130 and 134 and the inner edges 81 of the panels 38 and 40 face each other for when the trailer 10 is pulled by a vehicle and an expanded configuration (shown in FIGS. 9, 10, 11, 12, 13 and 15) in which the left and right panels 38 and 40 are open, the inner edges 81 face away from each other, the interior surfaces 132 and 136 face upwardly and are above the exterior surfaces 130 and 134 so that the camping trailer 10 may be used as shelter at a campsite. Optionally, the left and right panels 38 and 40 are rotated about 180 degrees in the expanded configuration relative to the collapsed configuration. Optionally, the camping trailer 10 may include a trailer hitch 18 located in front of the front wall 20. Optionally, as described below, a tent 14 may be attached to the trailer box 12 in the expanded configuration.

The Lid Seal

Referring to FIGS. 1-4, the trailer box 12 may include a top/lid 36 that is comprised of two panels, a left panel 38 and a right panel 40, that may be attached to the left and right sidewalls 26/30 respectively via piano hinges that extend parallel to the length 24 adjacent the outer edges 93 of the panels 38 and 40 that allow the panels 38 and 40 to fold outwards—i.e., open and close along the hinges. The top/lid 36 is preferably weather sealed when in the towing configuration. To accomplish this, as shown in FIGS. 1-4, a rubber foam seal/gasket 52 may be attached to the inner edge 81 of one or both of the left and right panels 38 and 40 that seals the top/lid 36 when both panels 38 and 40 are closed. The rubber seal 52 may be a custom extrusion designed to allow the panel edges 81 to slide by each other during closure and opening and to seal the gap when in closed position. The shape of the seal 52, its density, and the adhesive used to attach are designed so that the seal 52 will withstand the shear of closing into place and compress the seal 52 the desired amount. An exemplary design is shown in FIG. 4. In some embodiments, the seal 52 is a medium density foam (e.g., EPDM foam with a durometer of approximately 40).

Figure 1A:
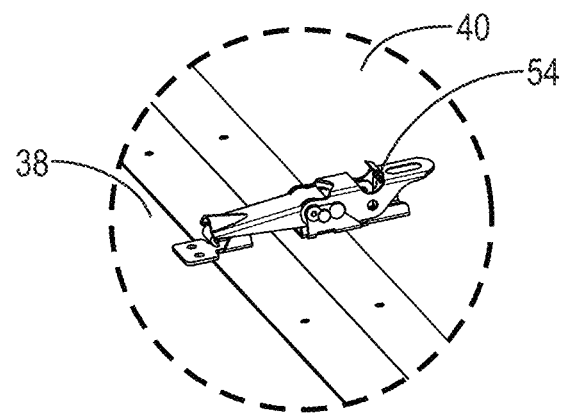
FIG. 1A illustrates a closeup view of the circled area labelled 1A in FIG. 1.
Figure 1B:
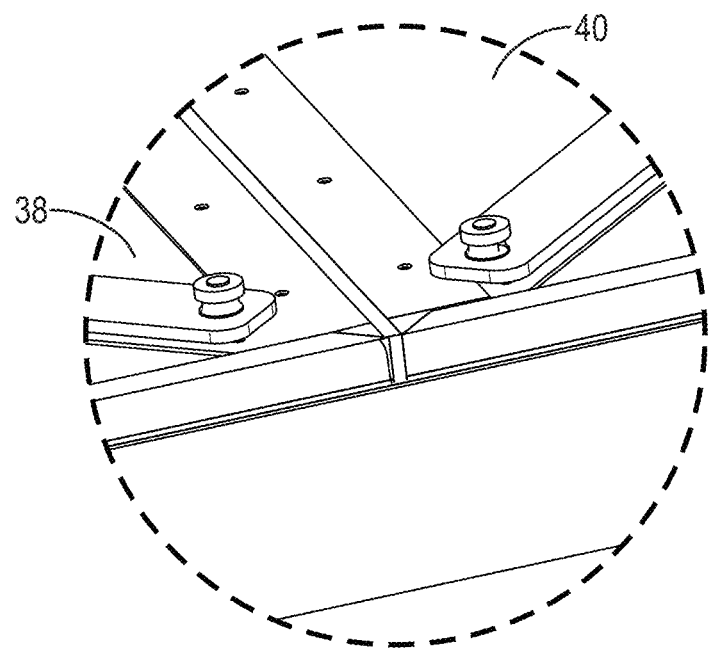
FIG. 1B illustrates a closeup view of the circled area labelled 1B a in FIG. 1.

As best seen in FIG. 1A, draw latches 54 are used to prevent the lid gap from widening.

The Bedbox and Wall Structural Support

Figure 5:
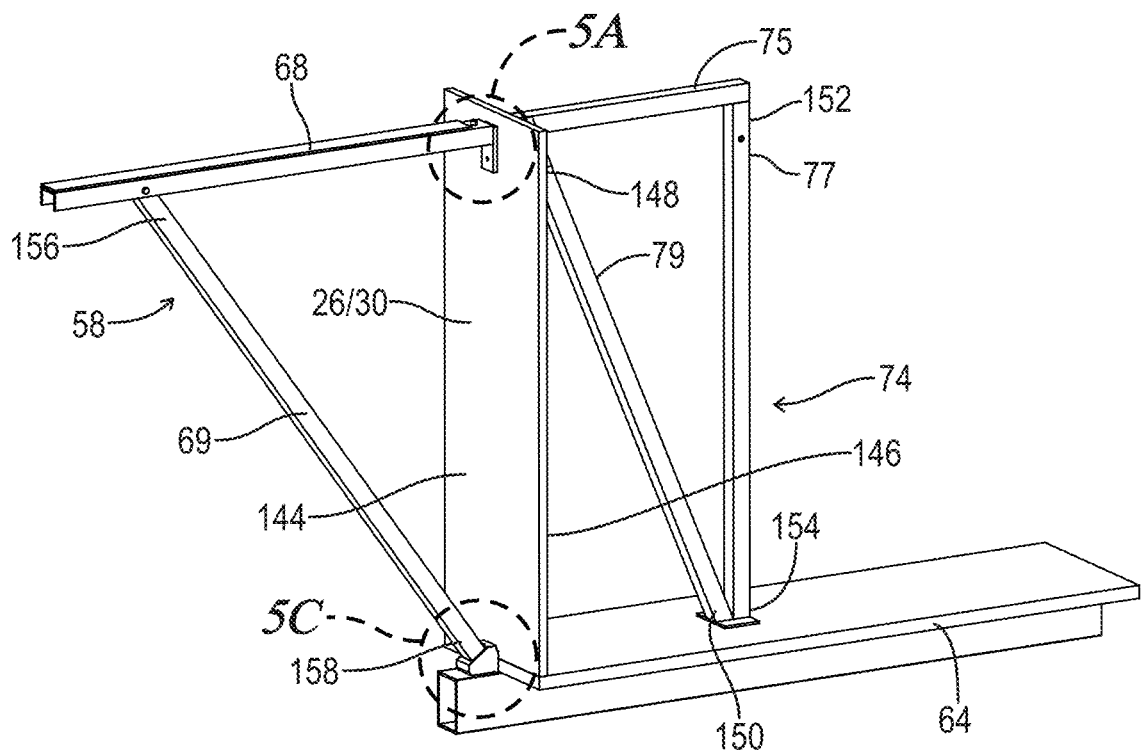
FIG. 5 illustrates a perspective view of an exemplary bed support system for use with the trailer boxes of the present invention.
Figure 5A:
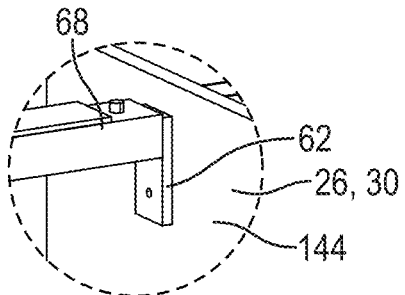
FIG. 5A illustrates a closeup view of the circled area labelled 5A in FIG. 5.
Figure 5B:
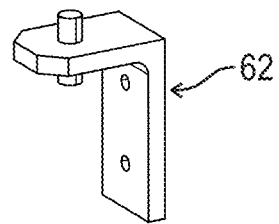
FIG. 5B illustrates a perspective view of a portion of the bracket shown in FIG. 5A.
Figure 5C:
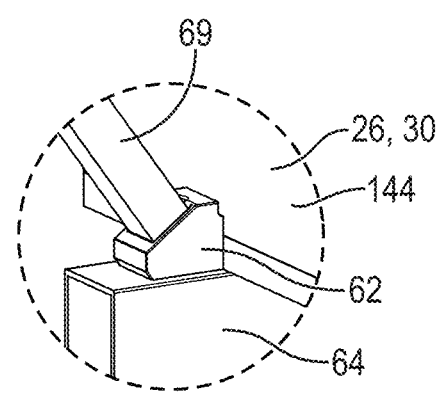
FIG. 5C illustrates a closeup view of the circled area labelled 5C in FIG. 5.
Figure 5D:
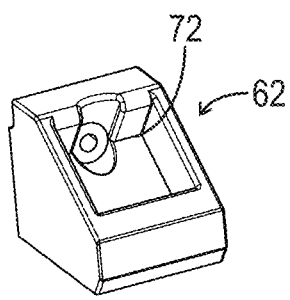
FIG. 5D illustrates a perspective view of the bracket shown in FIG. 5C.
Figure 12:
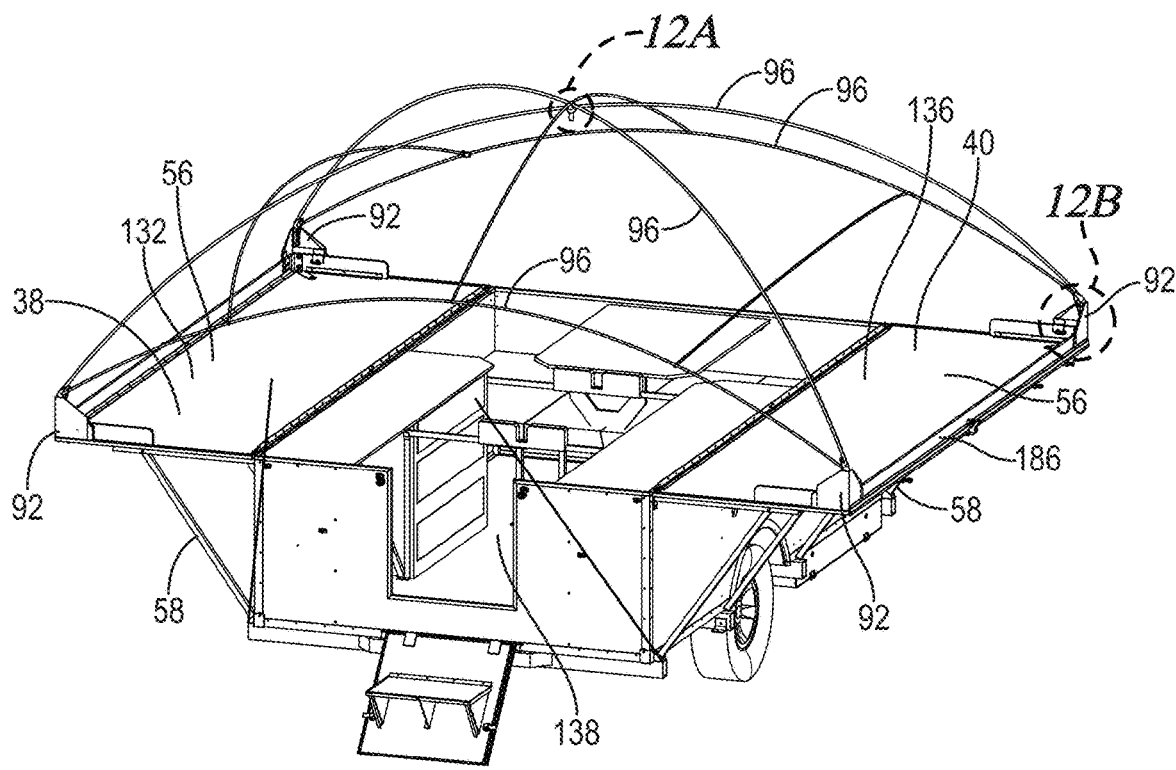
FIG. 12 illustrates a rear perspective view of tent poles of one embodiment of the present invention attached to the trailer box of FIG. 7 in the expanded configuration.

In the open configuration, the trailer box left and right panels 38/40 may fold out to become bed frames 56, as shown in FIG. 12 for example. (More particularly, in the illustrated embodiments, what were, in the collapsed/towing configuration, the interior surfaces 132 and 136 of the left and right panels 38 and 40 become, in the expanded configuration, the top of the bed frames 56). To support sufficient weight, a structural system using bed supports 58 to support the bed frames 56 and stabilize the trailer box sidewalls 26 and 30 was designed. An exemplary bed support system 58 is shown in FIG. 5. In particular, as shown in FIG. 5, bed supports 58 may attach to the outside of the left and right sidewalls 26/30 of the trailer box 12, with, for example, four bed supports 58 on the left sidewall 26 and four bed supports 58 on the right sidewall 30. In the illustrated embodiment, the bed supports 58 are foldable two-leg supports that are stored in "saddle boxes" attached under the trailer box 12 when not in use. These bed supports 58 may attach to, at one end, custom designed support fittings 62 near the top of the sidewall 26/30 and, at the other end, to the top of trailer cross members 64 of the trailer bottom/chassis 42 at the bottom. More particularly, the bed supports 58 may be comprised of a horizontal leg 68 that supports the left and right panels 38/40 (and faces the exterior surfaces 130 and 134) when the trailer box 12 is in the expanded configuration (i.e., when the left and right panels 38/40 are opened along the hinges) and an angled lower leg 69 that extends downwardly from the horizontal leg 68 towards the sidewall 26/30. As shown in FIG. 5C, the bottom of the angled lower leg 69 may rest in the receptacle 72 of the custom designed support fitting 62. The angled leg 69 and sidewall 26/30 may form a triangle with the horizontal top leg 68. In the illustrated embodiment, as shown in FIG. 5C, attachment to the bottom/chassis 42 is accomplished by the custom designed support fitting 62 that is attached to the top of each bottom/chassis crossmember 64 and/or to the sidewall 26/30. In addition, a custom designed support interior support frame 74 is attached to the sidewall 26/30 on the inside in line with the bed supports 58. The interior support frame 74 may be comprised of a horizontal leg 75, a vertical leg 77 and an angled leg 79. The bed support top fittings 62 may be attached to the legs 75, 77 and 79 of the inside frames 74 by metal screws. When the bed supports 58 are attached to the support fittings 62 outside the box 12, this creates a continuous truss from outside to inside to react all forces created by weight supported by the beds 56. As used herein, the term "attached" refers part that are joined as well as integral parts (e.g., one or more legs may be integral parts). A counter top/work surface (not shown) may attach to the interior support frame 74 to stabilize it laterally.

The Trailer Lid Supports In The Closed Position

Figure 6:
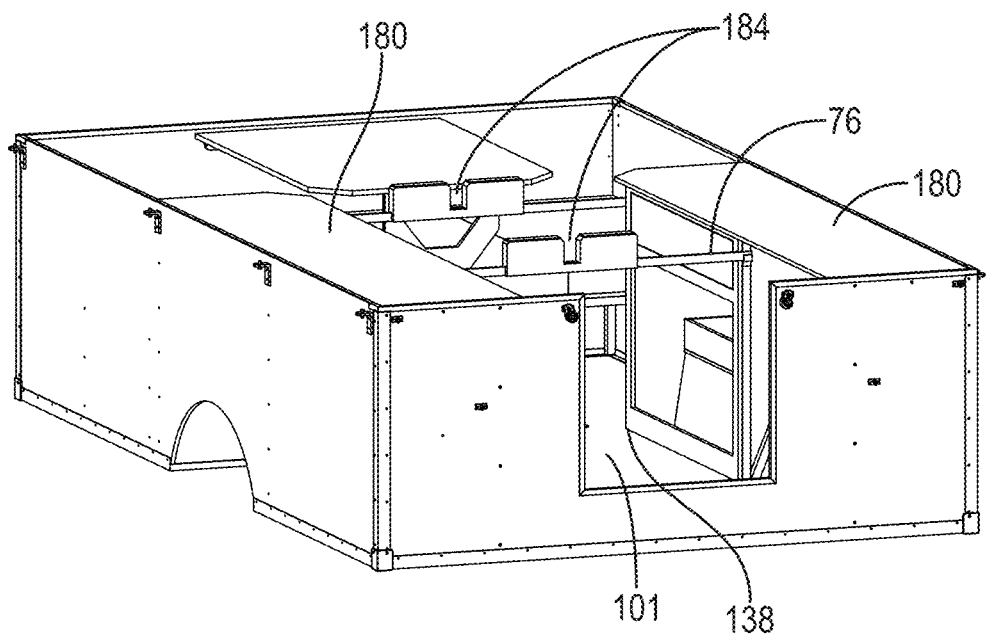
FIG. 6 illustrates a rear perspective view of a trailer box of one embodiment of the present invention, with the trailer box shown as partially transparent to reveal internal contents.
Figure 6A:
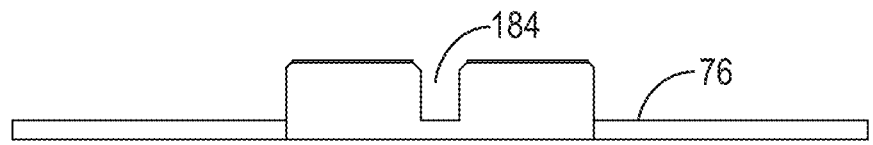
FIG. 6A illustrates a rear elevation view of a lid support of the trailer box of FIG. 6.
Figure 6B:
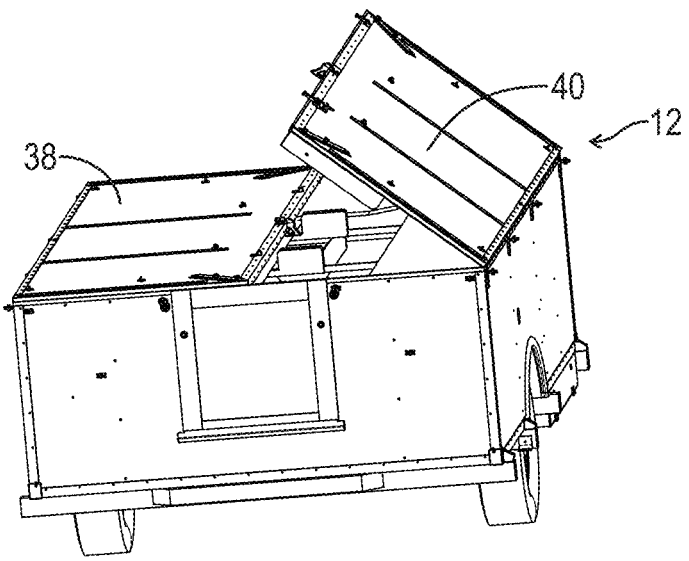
FIG. 6B illustrates a rear perspective view of the trailer box of FIG. 6, with the trailer box in the partially collapsed/towing configuration.

In the closed position (i.e., when the trailer box 12 is in the collapsed/towing configuration), the inner edges 81 of the left and right panels 38/40 rest on the front wall 16 and rear wall 20 at their ends—a 10 foot span. To allow items to be placed on top of the left and right panels 38/40 during towing, as shown in FIG. 6, the panels 38/40 are preferably supported between the front wall 16 and rear wall 20 as well. As shown in FIG. 6, there may be two removable/stowable internal support beams 76 that sit underneath the interior surfaces 132 and 136 of the left and right panels 38/40 when closed. These beams 76 may be supported at their ends by brackets attached to the interior support frames 74. When closed, the inner edges 81 of the left and right panels 38/40 may rest on these beams 76, which may extend generally parallel to the trailer box width 34. In the illustrated embodiment, the beams 76 support approximately 75 pounds each, allowing for items such as bicycles or luggage to be carried on top of the trailer box 12. As shown in the illustrations, the beams 76 may include cutouts/recesses 184 that may be rectangular in shape and, when the left and right panels 38 and 40 are closed, accommodate a fence 186 that may extend around the interior surfaces 132 and 136 of the left and right panels 38 and 40. See FIG. 6 and FIG. 12, which shows the fences 186.

The Trailer Step/Door Cutout Cover

As shown in FIGS. 7-9, one end (e.g., the rear 20) of the trailer box 12 may have a door cut-out 80 and a door 22 that covers the door cut-out 80 to weather during towing or storage. In addition, it was desirable to have a step 84 for entering the trailer box 12. The panel 22 shown in FIGS. 7-9 was designed to fill both functions—i.e., as a door and a step—by forming a step 84 on the interior surface 168 of the door 22.

The Tent

Exemplary tent designs are shown in FIGS. 9-15.

The tent 14 may be a dome or a modified dome design for example. For example, the dome may have vertical panels at the front and back to provide increased volume where needed for inside use—i.e., at the table and benches at the front of the interior 138 and at the door 22 at the rear of the interior 138. The tent 14 may be comprised of, for example, flat and compound curved panels made of a coated, highly water resistant canopy material (for the upper tent panels) and a strong vinyl coated fabric (for the skirt panels). The modified dome shape of the tent 14 was designed to be sturdy and stable in high winds and able to maintain its shape. It also was designed to better shed rain. The modified dome shape was also designed to place internal volume where needed for use (i.e., clearance for entering, exiting, and standing in the middle of the tent 14, and sitting at the table in the front of the tent 14). The tent 14 was designed to work with the internal poles 96 and trailer attachment approaches described herein.

Figure 15:
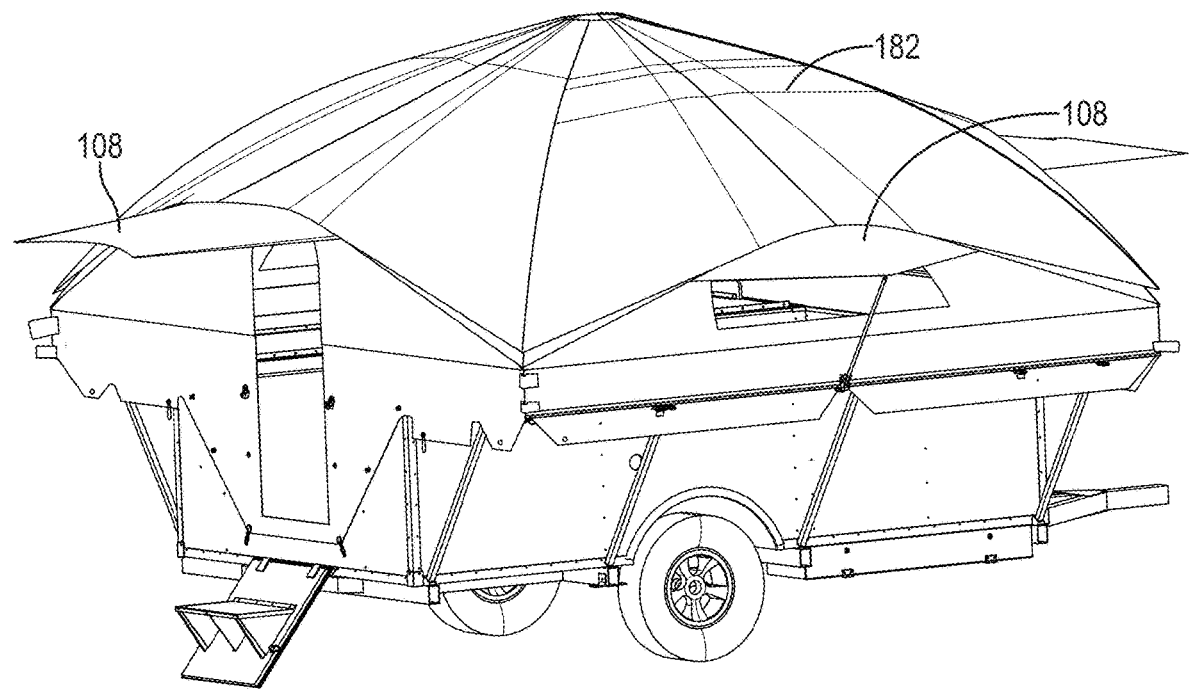
FIG. 15 illustrates a side perspective view of a tent cover of one embodiment of the present invention, which extends over a tent, which, in turn, is attached to the trailer box of FIG. 7 in the expanded configuration.
Figure 15A:
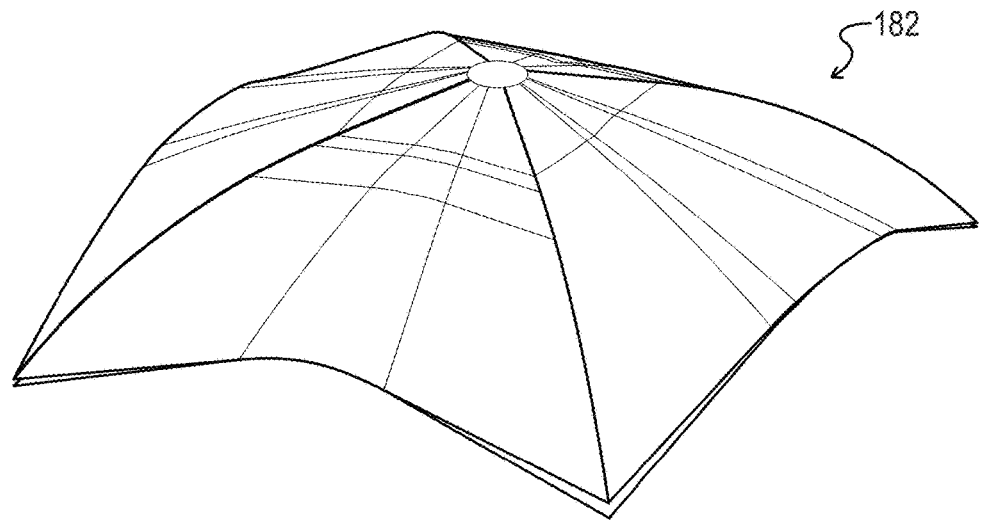
FIG. 15A illustrates a side top perspective view of the tent cover of FIG. 15.
Figure 15B:
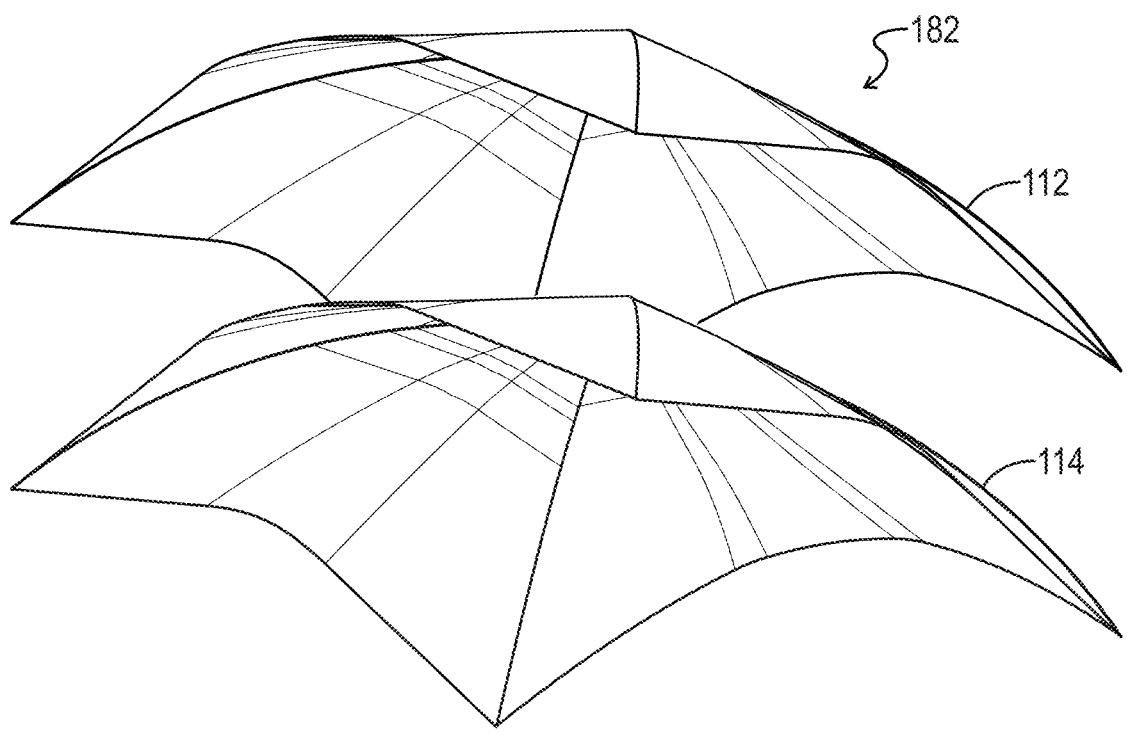
FIG. 15B illustrates a side exploded view of the tent cover of FIG. 15.

In some embodiments, as shown in FIG. 15B, the tent 14 is covered by a tent cover 182 that is comprised of a plurality of layers, e.g., a top/exposed layer 112 and a bottom/interior layer 114. Optionally, the bottom layer 114 is an insulating layer. The reasoning for coming up with the multi-layer system is as follows. Typically, the fabric of a tent rain cover should not lay in direct contact with the tent fabric if it is to provide an effective barrier to water penetration. Thus, a cover for a "waterproof tent" typically is stretched around poles that are external to the tent which creates an air gap. However, the camping trailer 10 of the present invention preferably uses poles 96 that are inside the tent 14, which requires a rain cover with its own barrier between fabrics. Thus, in some embodiments, a multilayer tent cover 182 is provided with a top/exposed layer 112 that may be comprised of, for example, fabric, and a bottom/interior layer 114 that provides a barrier. The bottom/interior layer 114 may be, for example, one or more of the following: a thin foam or bubble layer with a reflective layer on each side typically referred to as reflective insulation or roll insulation, a thin radiant barrier typically with a thickness of, for example, 4 to 8 mils that has a very low permeability effectively making it waterproof, or a combination of reflective insulation and radiant barrier. Optionally, the bottom/interior layer 114 is sewn to the top/exposed layer 112 or attached by fasteners such as snaps or others that allow the bottom layer 114 to be detached.

Figure 10:
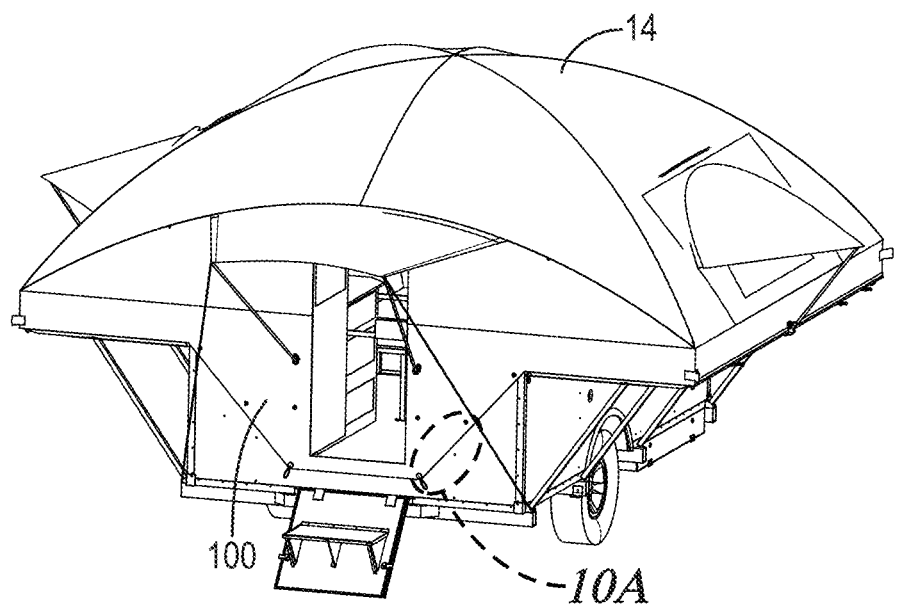
Figure 10A:
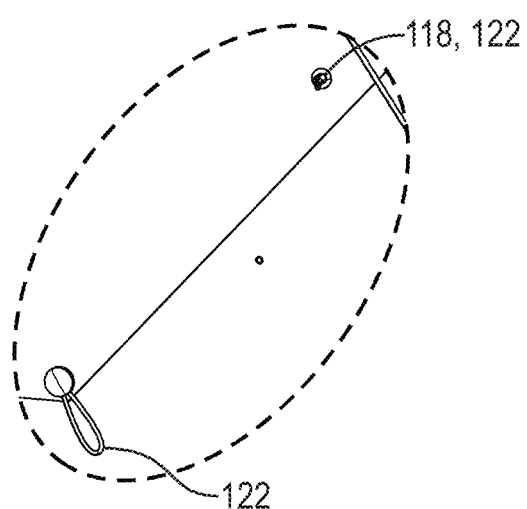
FIG. 10A illustrates a closeup view of the circled area labelled 10A in FIG. 10.
Figure 10B:
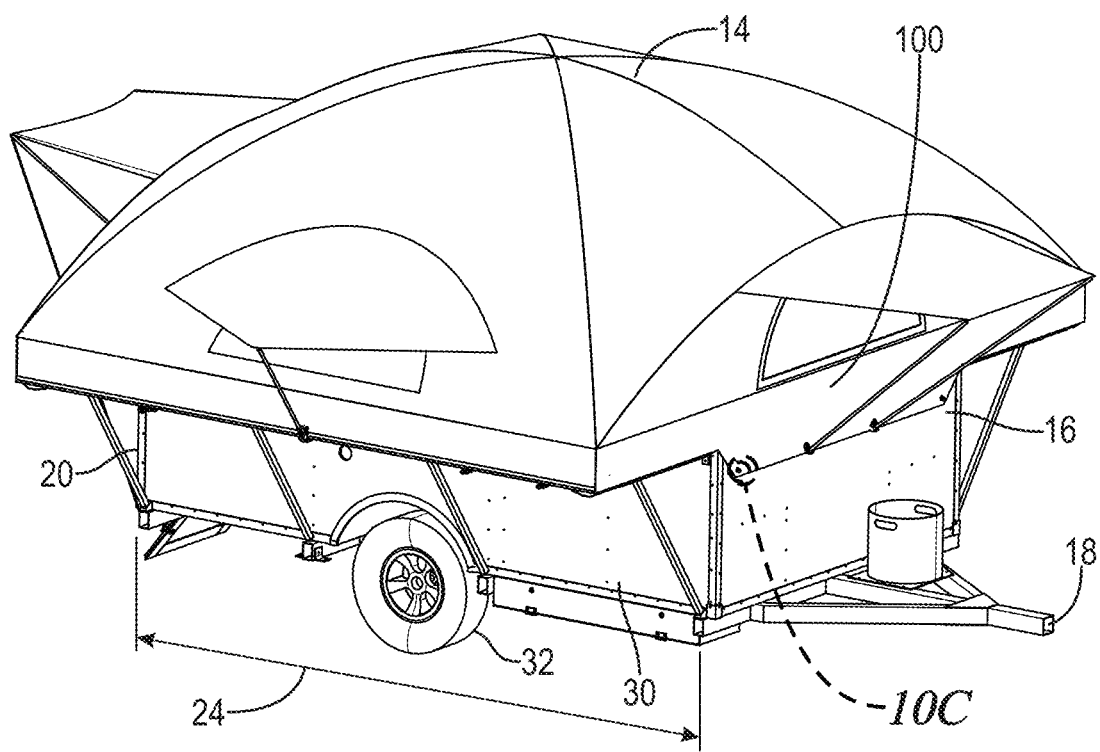
FIG. 10B illustrates a side perspective view of the trailer box of FIG. 7 in the expanded configuration attached to a tent of one embodiment of the present invention.
Figure 10C:
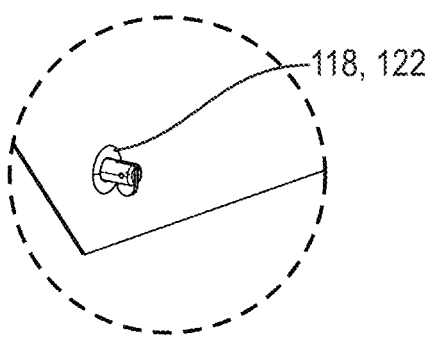
FIG. 10C illustrates a closeup view of the circled area labelled 10C in FIG. 10B.
Figure 11:
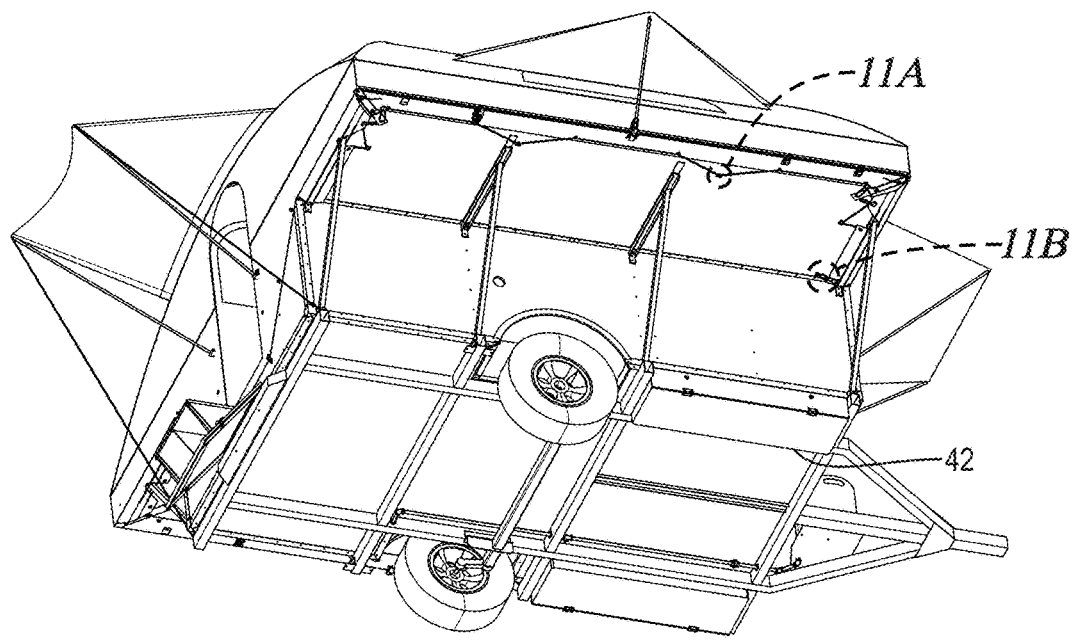
FIG. 11 illustrates a bottom perspective view of the trailer box of FIG. 7 in the expanded configuration attached to a tent of one embodiment of the present invention.
Figure 11A:
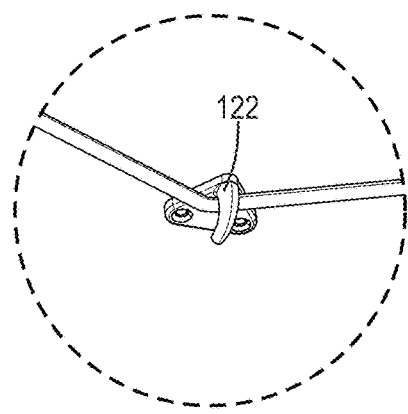
FIG. 11A illustrates a closeup view of the circled area labelled 11A in FIG. 11.
Figure 11B:
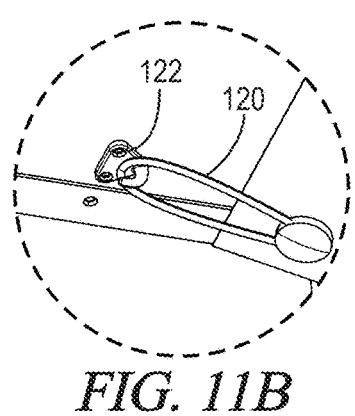
FIG. 11B illustrates a closeup view of the circled area labelled 11B in FIG. 11.

The tent 14 may attach to the trailer box 12 via, for example, corner braces 92 that attach to the unfolded left and right panels 38 and 40 to provide rigid supports for the poles 96; and, as shown in FIGS. 10 and 11, a heavy duty tent 'skirt' 100 with a system with a system of grommet holes 118, bungee cord 120 and bungee fasteners 122 that mate to fasteners (e.g., shock cord knobs, toggle posts and hooks) on the trailer box 12.

The Corner Braces

In an exemplary embodiment, as shown in FIG. 12, in the expanded configuration, the corner braces 92 are located at the rear left corner and the front left corner of the left panel 38, and the front right corner and the rear right corner of the right panel 40. In the exemplary embodiment, as shown in FIG. 12B, the corner braces 92 includes a base bracket 188 that mates with fence 186 located on the interior surfaces 132 and 136 (e.g., fits over the corners of the fence 186). However, other methods of securing the corner braces 92 to the left and right panel 38 and 40 are possible.

In an exemplary embodiment, the corner brace 92 includes corner brace receptacles 94 that hold the bases of the interior poles 96 and are angled, for example, between about 40 degrees and about 60 degrees relative to the ground. Preferably the corner bracket receptacles 94 are elevated (e.g., at least about 6 inches) above the left and right panels 38 and 40 to provide sufficient space for the bed mattress and occupant.

More particularly, in a typical camping tent, the ends of the poles of a dome tent that sits on the ground are anchored by stakes in the ground. Such a camping tent has a higher arch so that the poles meet the ground more nearly vertical to provide the internal space needs.

By contrast, in some embodiments of the present disclosure, the tent 14 is designed to be attached to the unfolded trailer box 12. Accordingly, it was appreciated that there was a need for something that acts like a rigid vertical pole attached rigidly to the corners of the unfolded trailer box 12. In such embodiments, the pole ends preferably are elevated above the left and right panels 38 and 40 by the corner bracket receptacles 94 as noted above. Without the rise, the peak of the pole arches (the peak of the tent 14) would have to be much higher to allow the poles 96 to be more vertical where they meet the left and right panels 38 and 40. That makes for a heavier, less stable tent that is more susceptible to wind forces. Another part of the solution was to bring the poles 96 inside the tent 14. That allows the outer contour to be smooth, making it less susceptible to wind forces and greatly simplifying setup. But it also presented problems to be solved. Earlier versions had the poles outside the tent running through exterior pole sleeves—the approach used by many dome tents. Setting up the tent was more difficult and time consuming and the result was more susceptible to wind forces.

FIG. 12 shows the pole clip 98 that holds the two main diagonal poles 96 together at their middle. A pole clip 98 was used because this tent approach uses no pole sleeves. The main interior poles 96 and the shaping poles 96 act as a skeleton that the tent 14 stretches around. The skirt 100 of the tent 14 attaches to the trailer 10. It all works together to enable a tent 14 that is efficient in its interior space—volume where needed—in a dome shape which sheds water and wind—and is well stretched (not saggy) and very stable in use.

The Interior Poles and Pole/Tent Fasteners

Figure 12A:
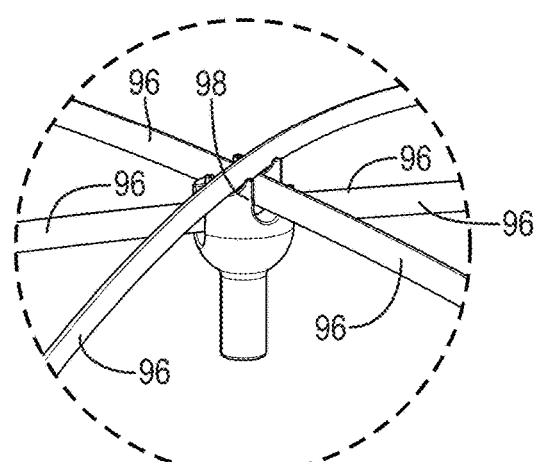
FIG. 12A illustrates a closeup view of the circled area labelled 12A in FIG. 12.
Figure 12B:
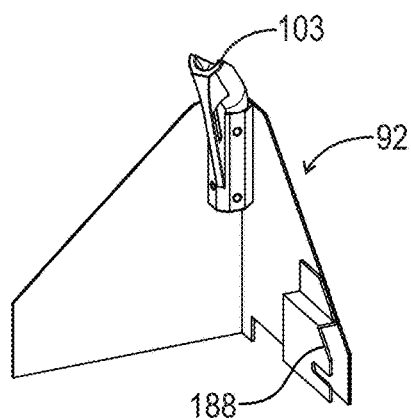
FIG. 12B illustrates a closeup view of the circled area labelled 12B in FIG. 12.
Figure 14:
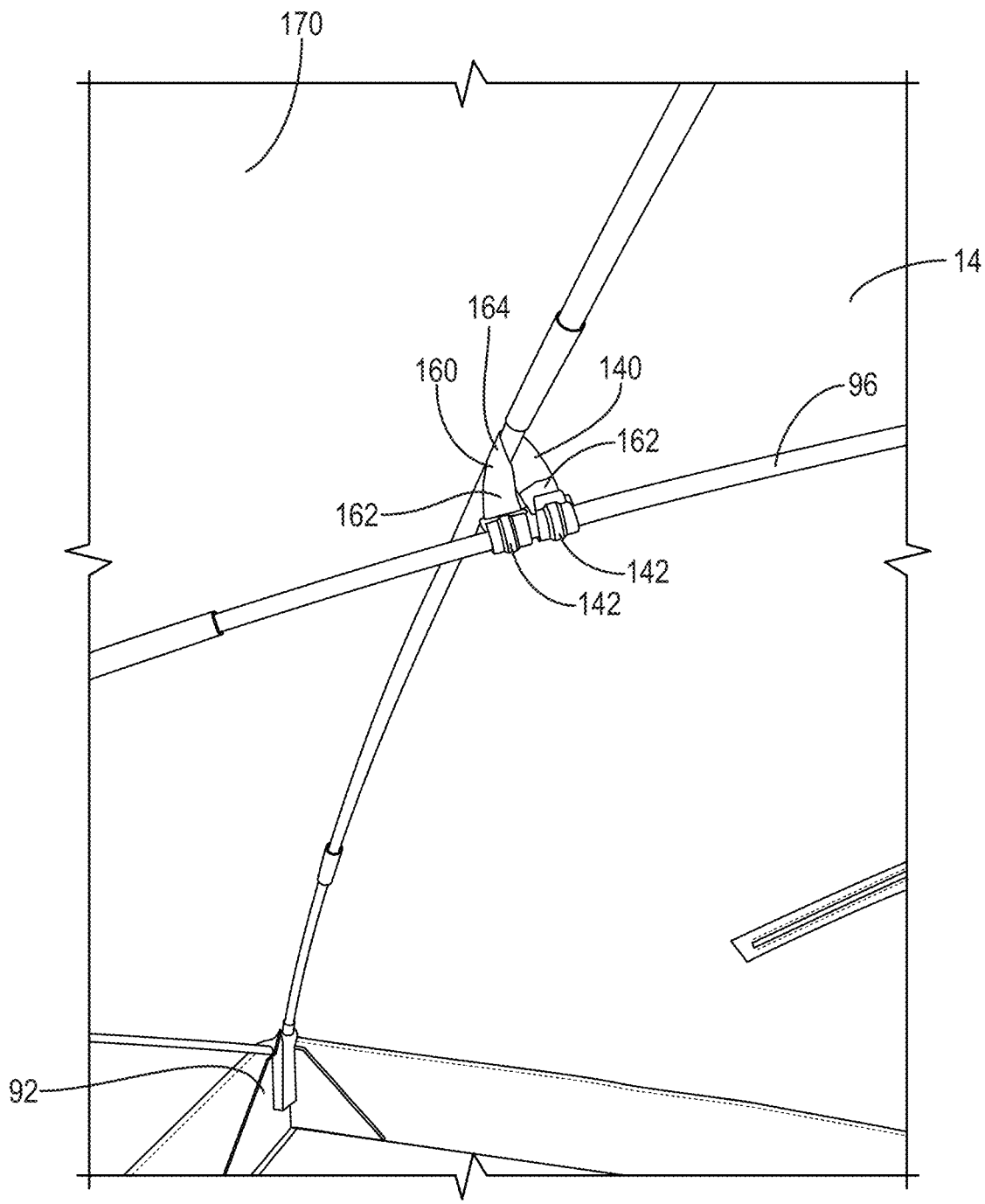
FIG. 14 illustrates a perspective view of a tent and exemplary clip and strap system that grips the shaping poles and also holds the main poles over the main tent seams in accordance with one embodiment of the present invention.

FIGS. 12 and 12A and FIG. 14 illustrate a system of interior poles 96 located interior in the tent 14 and designed to support and shape the tent 14.

In the illustrated embodiment, as shown in FIGS. 12 and 12A, for example, there are two main interior poles 96 that extend diagonally across the trailer box 12 and have a base at their front end and rear end, and the bases are received in the corner brace receptacles 103. In additional, the main interior poles 96 each may include an upper segment (midway between the bases) that is received in the pole clip receptacles 99. There are also five shaping interior poles 96. In the illustrated embodiment, both the main interior poles 96 and shaping interior poles 96 form part of the skeleton that shape the tent 14.

With the tent 14 stretched against internal poles 96, in order to prevent water from migrating through the tent fabric during rain, it is desirable to keep the main interior poles 96 centered directly against the seam sealing tape that is applied to the inside of the diagonal tent seams. Therefore, in the illustrated embodiment, a set of short straps (e.g., 1-3 feet in length) 140 with associated clips 142 is attached to the interior surface 170 of the tent 14 centered on each diagonal tent seam. See FIG. 14. This serves two purposes: the main interior poles 96 are held on the sealing tape, and the shaping interior poles 96 are held in the correct position inside the tent 14. For example, the straps 140, by wrapping around the main interior poles 96, keep the main interior poles 96 in place against the main diagonal tent seams and against the seam sealing tape. The straps 140 also clip to two of the shaping interior poles 96 to hold those shaping interior poles 96 in place relative to the tent 14 and the main interior poles 96. Each strap 140 may be sewed to the tent 14 at the strap top end 160 and have pole clips 14 sewn to the strap bottom end 162. The straps 140 are sewed at the correct position at the main diagonal tent seams (which are also covered by seam sealing tape) so that they not only hold the main interior poles 96 against the diagonal tent seams, they also hold two of the shaping interior poles 96 where they need to cross the main interior poles 96.

The Tent Raise System

Figure 12C:
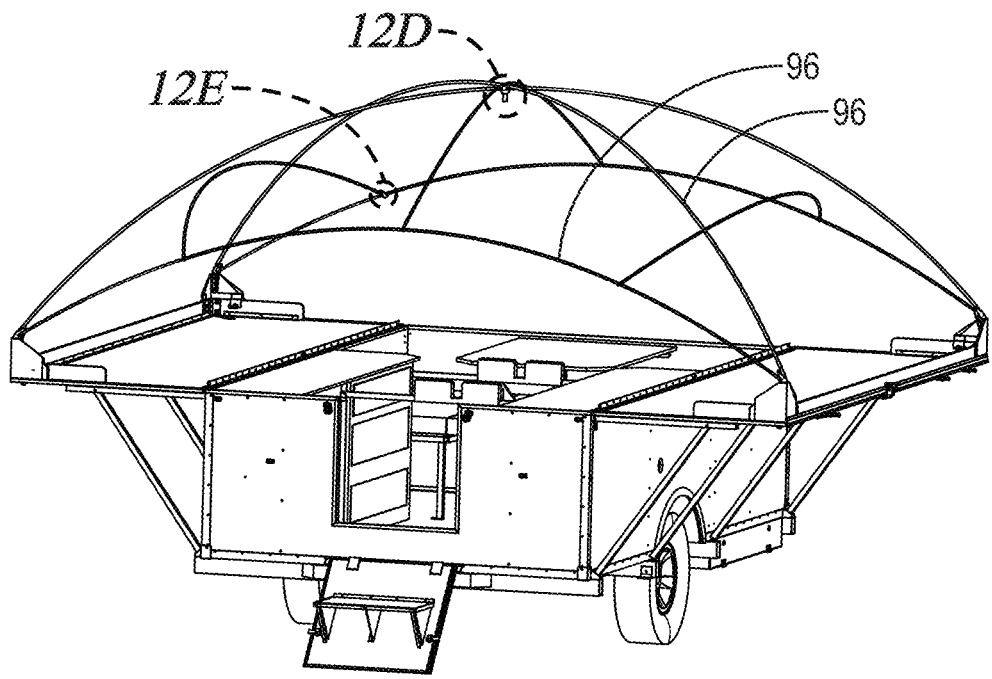
FIG. 12C illustrates a rear perspective view of tent poles attached to the trailer box of FIG. 7 in the expanded configuration.
Figure 12D:
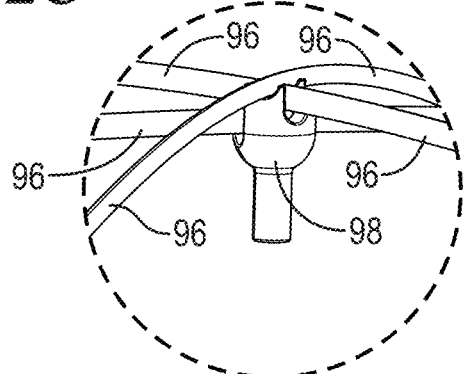
FIG. 12D illustrates a closeup view of the circled area labelled 12D in FIG. 12C.
Figure 12E:
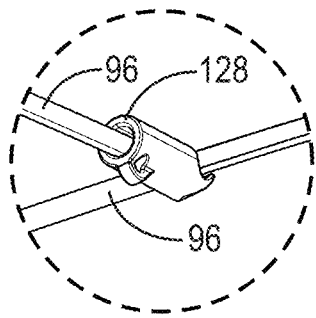
FIG. 12E illustrates a closeup view of the circled area labelled 12E in FIG. 12C.
Figure 12F:
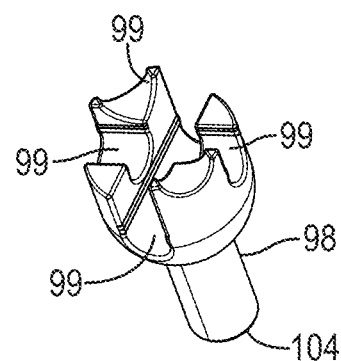
FIG. 12F illustrates a closeup view of the circled area labelled 12F in FIG. 12D.
Figure 12G:
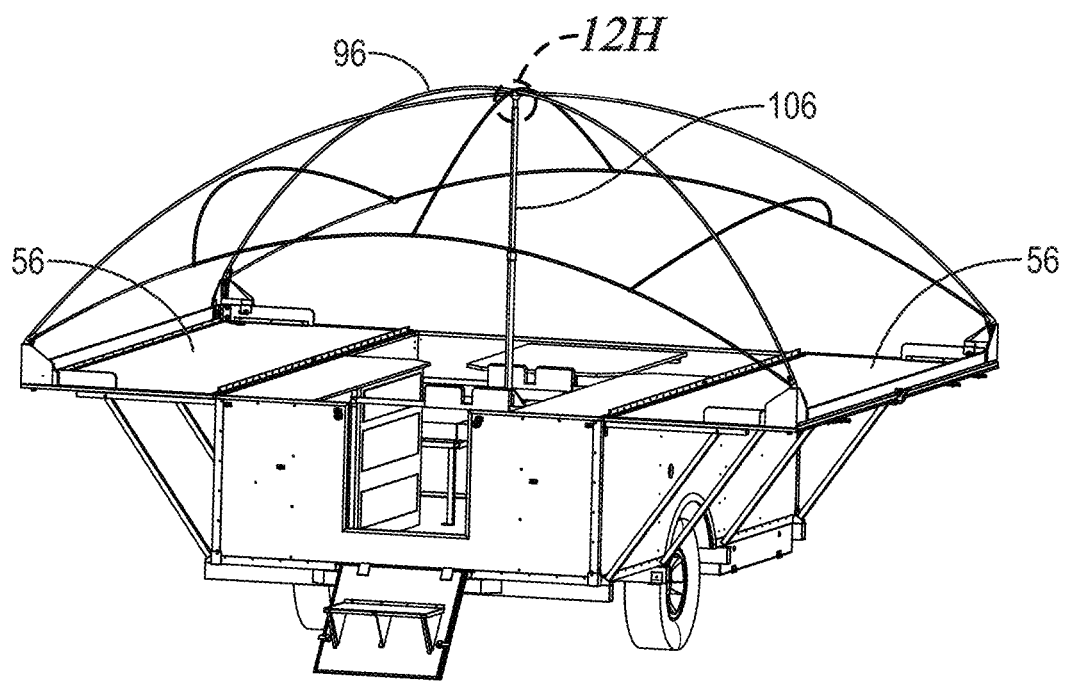
FIG. 12G illustrates a rear perspective view of tent poles attached to the trailer box of FIG. 7 in the expanded configuration.
Figure 12H:
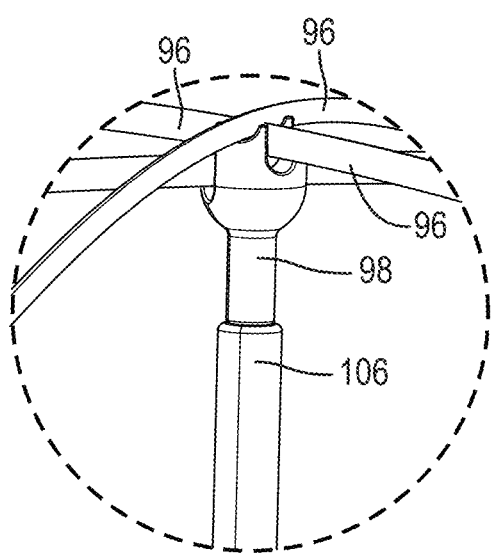
FIG. 12H illustrates a closeup view of the circled area labelled 12H in FIG. 12G.
Figure 12I:
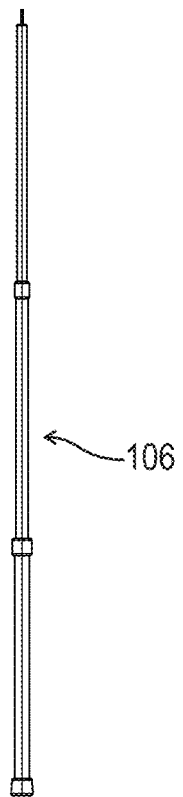
FIG. 12I illustrates a perspective view of the telescoping pole shown in FIG. 12G.

FIG. 12 also illustrates an exemplary tent raise system that is comprised of a tent-raise fitting (also referred to as a pole clip 98). Preferably, the pole clip 98 allows the tent 14 to be erected by one person. Preferably, the bases of the main interior poles 96 do not apply bending stress on the corner braces 92 during erection. As shown, in FIG. 12B and as previously mentioned, the corner braces 92 may include corner brace receptacles 103 to support the bases/bottoms of the main interior poles 96. As shown in FIGS. 12 and 12A, the pole clip 98 may include top receptacles/grooves/channels 99 designed to hold and center the upper segments of the main interior poles 96 (which may be located midway between the bases at the longitudinal center of the main interior poles 96) at the right height vertically and may also stack the poles 96 where they cross. The pole clip 98 may include a bottom receptacle 104 that accepts the top end of a vertically-aligned telescoping pole 106. The telescoping nature of the telescoping pole 106 allows the tent 14 to be raised to the correct height so the ends of the main interior poles 96 may be inserted into the corner braces 92 with no bending stress. Preferably, the telescoping pole 106 rests on the box floor 101 in the trailer interior 12 (and is not bolted). To raise the tent poles 96, the tent posts may be arranged in an x-shaped pattern and the user may push up using the telescoping pole 106. After the bases of the main interior poles 96 are inserted into the corner brace receptacles 96, the telescoping pole 106 may be removed and stored until the telescoping pole 106 is used in the process of lowering the tent 14. As shown in FIGS. 12C and 12E, the camping trailer 10 may include front and back arch poles 96 that extend parallel to width 34. These front and back arch poles 96 are connected to the three longitudinal shaping poles 96 (that extend parallel to length 24) by pole receptacles 128.

The No Ground Contact Awning Support Poles

Figure 13:
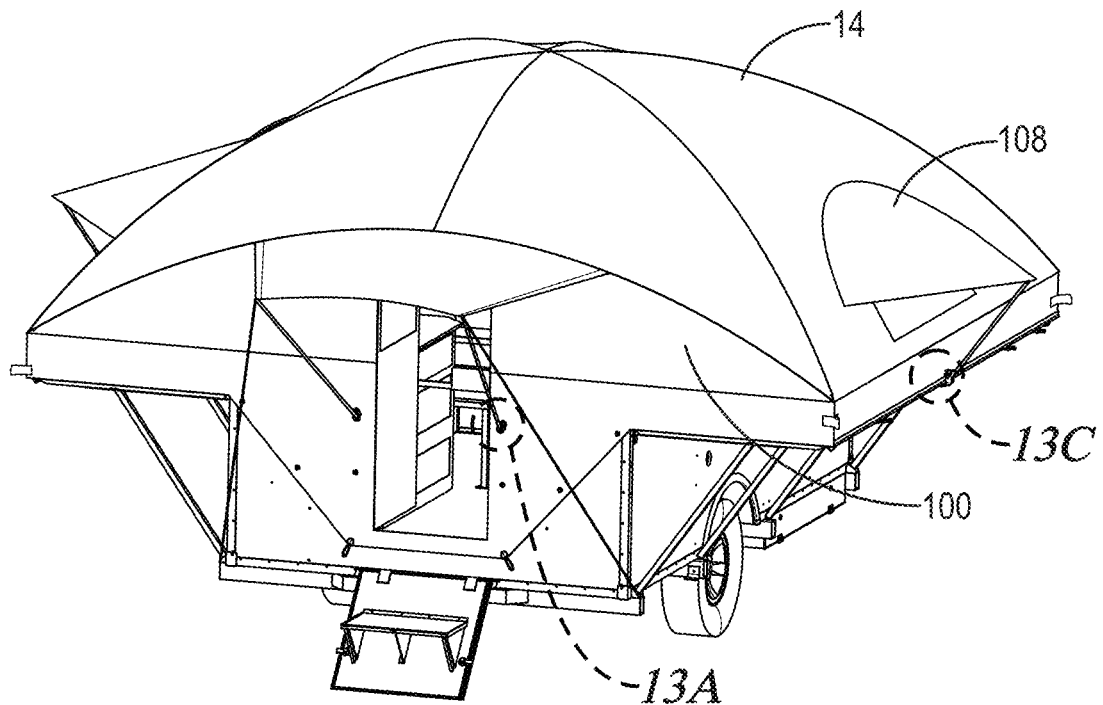
FIG. 13 illustrates a rear perspective view of tent poles attached to the trailer box of FIG. 7 in the expanded configuration.
Figure 13A:
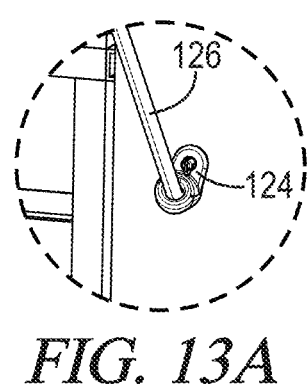
FIG. 13A illustrates a closeup view of the circled area labelled 13A in FIG. 13.
Figure 13C:
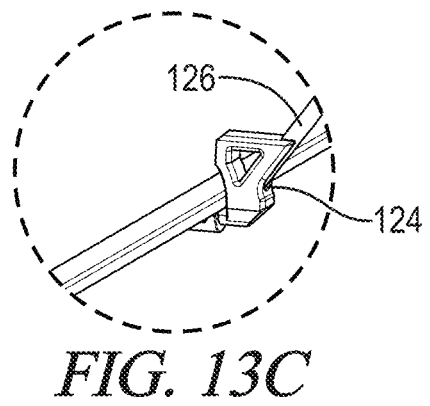
FIG. 13C illustrates a closeup view of the circled area labelled 13C in FIG. 13.
Figure 13B:
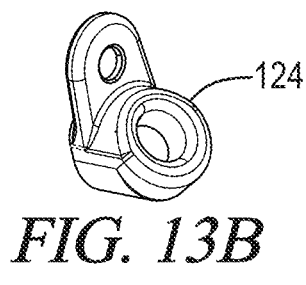
FIG. 13B illustrates a perspective view of the bracket shown in FIG. 13A.
Figure 13D:
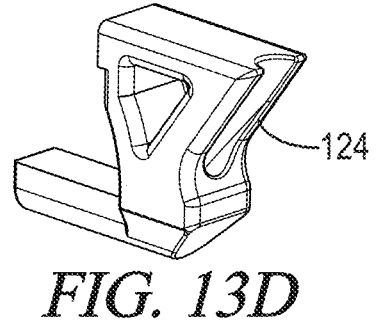
FIG. 13D illustrates a perspective view of the bracket shown in FIG. 13C.

As shown in FIG. 13, the windows and the door 22 may be protected by awnings 108. In the prior art, awnings are typically supported at their ends by ground to awning poles and guy lines staked to the ground. By contrast, in some embodiments, the present disclosure uses a no-ground-contact awning support system that allows the camper 10 to be set up and used in wilderness settings as well as on hard surfaces such as concrete or asphalt as found in RV campsites. More particularly, an awning support fitting 124 for the side awnings 108 was designed to attach to the trailer box 12 and support the bottom ends of the side window awning poles 126. The side awning pole 126 may insert into the fitting 124. Attaching it to the awning 108 may require the pole 126 to be bent a small amount which maintains the awning 108 in the correct stretched position. This fitting 124 may eliminate the need for support pole guy-lines for the side window awnings 108. In addition, a support fitting 124 for the front and back awnings 108 was designed to attach to the trailer box 12 and support the bottom ends of the front and back awnings 108. These were designed to attach to the trailer box 12 in a place that pole guy-lines can be attached to the trailer box 12 rather than be staked out to the ground.

| Parts List | |
|---|---|
| Camping Trailer | 10 |
| Trailer Box | 12 |
| Tent | 14 |
| Trailer Box Front | 16 |
| Trailer Hitch | 18 |
| Trailer Box Rear | 20 |
| Trailer Box Rear Door | 22 |
| Trailer Box Length | 24 |
| Left Sidewall | 26 |
| Left Wheel | 28 |
| Right Sidewall | 30 |
| Right Wheel | 32 |
| Trailer Box Width | 34 |
| Trailer Box Top/Lid | 36 |
| Top Left Panel | 38 |
| Top Right Panel | 40 |
| Trailer Box Bottom/Chassis | 42 |
| Trailer Box Height | 44 |
| Piano Hinges | (not shown) |
| Rubber Foam Seal/Gasket | 52 |
| Draw Latches | 54 |
| Bed | 56 |
| Bed Supports | 58 |
| Support Fittings | 62 |
| Trailer Cross Members | 64 |
| Horizontal Legs | 68 |
| Vertical Legs | 69 |
| Support Cradle Receptacle | 72 |
| Support Frame | 74 |
| Horizontal leg | 75 |
| Removable/Stowable Internal Support Beams | 76 |
| Vertical leg | 77 |
| Support Frame Brackets | 78 |
| Angled leg | 79 |
| Door Cut-Out | 80 |
| Panel edge | 81 |

-continued

| Parts List | |
|---|---|
| Stair/Panel | 84 |
| Corner braces | 92 |
| Outer edges | 93 |
| Corner brace Receptacles | 94 |
| Tent Poles | 96 |
| Pole Clip/Tent Raise Fitting | 98 |
| Top receptacle | 99 |
| Tent Skirt | 100 |
| Box floor | 101 |
| Strap With Clips | 102 |
| Corner brace receptacle | 103 |
| Pole Clip Receptacle | 104 |
| Telescoping Pole | 106 |
| Awnings | 108 |
| Tent top layer | 112 |
| Tent bottom layer | 114 |
| Bungee cord | 118 |
| Grommet hole | 120 |
| Fastener | 122 |
| Awning fitting | 124 |
| Awning pole | 126 |
| Pole receptacle | 128 |
| Left panel exterior surface | 130 |
| Left panel interior surface | 132 |
| Right panel exterior surface | 134 |
| Right panel interior surface | 136 |
| Interior | 138 |
| Pole strap | 140 |
| Clip for pole straps | 142 |
| Sidewall exterior surfaces | 144 |
| Sidewall interior surfaces | 146 |
| Angled interior leg top | 148 |
| Angled interior leg base | 150 |
| Vertical interior leg top | 152 |
| Vertical interior leg base | 154 |
| Angled exterior leg top | 156 |
| Angled exterior leg base | 158 |
| Strap upper end | 160 |
| Strap lower end | 162 |
| Door exterior | 166 |
| Door interior | 168 |
| Tent interior | 170 |
| Counter-top | 180 |
| Tent cover | 182 |
| Cut-out | 184 |
| Fence | 186 |
| Base bracket | 188 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of attaching a tent to a camping trailer box, the method comprising performing the following steps in any suitable order:
    a) providing a trailer box comprising an interior, a front wall, a rear wall, a length extending from the front wall to the rear wall, a left sidewall comprising a top and a bottom, at least one left wheel located adjacent to the bottom of the left sidewall, a right sidewall comprising a top and a bottom, at least one right wheel adjacent to the bottom of the right sidewall, a width extending from the left sidewall to the right sidewall and perpendicular to the length, a lid comprising a left panel comprising an inner edge and an outer edge, an interior surface and an exterior surface, and a right panel comprising an inner edge and an outer edge, an interior surface and an exterior surface, a bottom, and a height extending from the lid to the bottom, wherein the left panel is attached to the left sidewall via a left hinge located adjacent to the outer edge of the left panel, and the right panel is attached to the right sidewall via a right hinge located adjacent to the outer edge of the right panel, the trailer box having a collapsed configuration in which the inner edges of the left and right panels face each other, in which the left and right panels are closed and in which the interior surfaces of the left panel and right panel face downwardly and towards the and an expanded configuration in which the left panel is configured to rotate relative to the top of the left sidewall compared to in the collapsed configuration, in which the right panel is configured to rotate relative to the top of the right sidewall compared to in the collapsed configuration, in which the inner edges of the left and right panels do not face each other, in which, the left and right panels are open, and in which the interior surfaces of the left panel and right panel face upwardly and are above the left panel and right panel exterior surfaces;
    b) folding the trailer box laterally outward from the collapsed configuration to the expanded configuration;
    c) providing a plurality of corner braces comprising a plurality of corner brace receptacles, one or more of said corner braces secured to the left panel and one or more of said corner braces secured to the right panel;
    d) providing a plurality of main interior poles, said main interior poles comprising one or more bases and an upper segment;
    e) providing a pole clip comprising a lower region comprising a pole clip receptacle and an upper region comprising a plurality of main interior pole receptacles configured to hold at least some of the upper segments of the main interior poles;
    f) placing at least some of the upper segments into the main interior pole receptacles;
    g) providing a telescoping pole comprising a base and an upper end;
    h) placing the telescoping pole upper end into the pole clip receptacle;
    i) raising the telescoping pole upper end and pole clip vertically;
    j) positioning at least some of the bases of the main interior poles in the corner brace receptacles; and
    k) providing a tent,
wherein after steps a)-k), the tent is located directly over the main interior poles and the pole clip so that the main interior poles and the pole clip are interior to an interior surface of the tent and the tent interior surface faces the trailer box interior.

2. The method of claim 1 wherein, after steps a)-k), the plurality of main interior poles and the pole clip form a dome-shaped tent frame and further wherein the pole clip is located at an apex and a lengthwise and widthwise center of the dome-shaped frame.

3. The method of claim 1 wherein the trailer box interior comprises a lengthwise and widthwise center and further wherein, after step a)-k), the pole clip is located directly above the lengthwise and widthwise center of the trailer box interior.

4. The method of claim 1 wherein the tent comprises a lengthwise and widthwise center and further wherein, after steps a)-k), the pole clip is located directly below the lengthwise and widthwise center of the tent.

5. The method of claim 1 wherein the plurality of main interior poles comprise a first main interior pole and a second main interior pole, wherein, after steps a)-k), the pole clip upper region comprises a first channel holding the first main interior pole, and a second channel located below the first channel, crossing under the first channel, and holding the second main interior pole.

6. The method of claim 1 wherein the left panel and right panel are supported by a plurality of exterior supports comprising a horizontal leg attached to an exterior surface of the left or right sidewall and an angled leg extending downwardly from the horizontal leg and comprising a base attached to the exterior surface of the left or right sidewall or trailer box bottom.

7. The method of claim 6 wherein the angled legs form an angle of approximately 30 to 60 degrees relative to the left or right sidewalls.

8. The method of claim 6 wherein the trailer box further comprises a plurality of interior triangular supports comprising an interior horizontal leg attached to an interior surface of the left or right sidewall, an interior vertical leg extending downwardly from the interior horizontal leg and comprising a base attached to the trailer box bottom, and an angled interior leg located laterally relative to the vertical leg and comprising extending downwardly at an angle from the horizontal leg or the interior surface of the left or right sidewall and comprising a bottom attached to the trailer box bottom.

9. The method of claim 6 wherein the exterior angled legs are attached to the left or right sidewalls by brackets.

10. The method of claim 1 wherein said corner braces are comprised of a plurality of plates.

11. The method of claim 1 further comprising the step of securing the tent to the camping trailer box using one or more fasteners.

12. The method of claim 1 wherein the inner edge of the left panel or the inner edge of the right panel comprise a seal configured to prevent water from between the inner edge of the left panel and the inner edge of the right panel when the trailer box is in the collapsed configuration.

13. The method of claim 12 wherein the trailer box further comprises a latch extending across the exterior surfaces of the left panel and the right panel parallel to the width in the collapsed configuration to removably lock the trailer box in the collapsed configuration and to prevent water from between the inner edge of the left panel and the inner edge of the right panel when the trailer box is in the collapsed configuration.

14. The method of claim 1 wherein the trailer box further comprises a plurality of internal support beams extending across the trailer box width in the collapsed configuration, facing the interior surfaces of the left and right panels and supporting the left and right panels.

* * * * *